No. 627,559. Patented June 27, 1899.
C. H. WHITNEY.
SEEDING ATTACHMENT FOR PLOWS.
(Application filed Mar. 8, 1899.)
(No Model.)
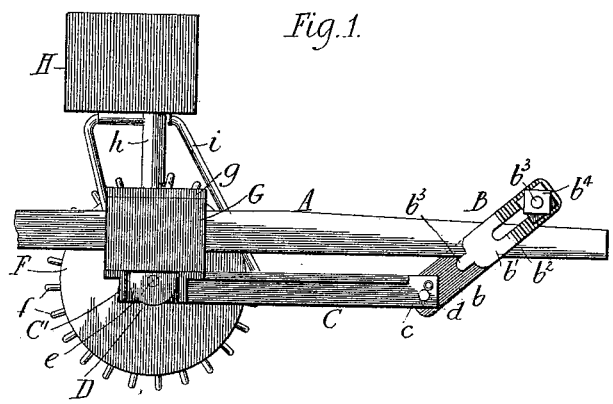
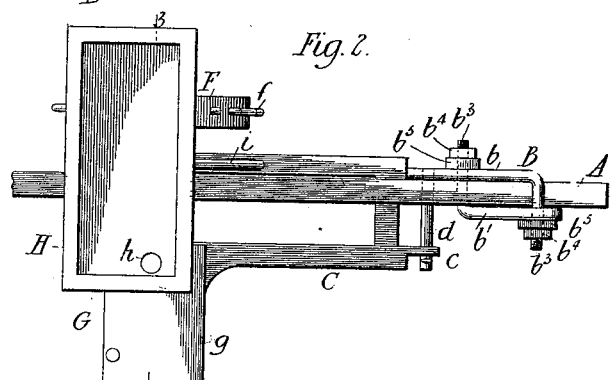
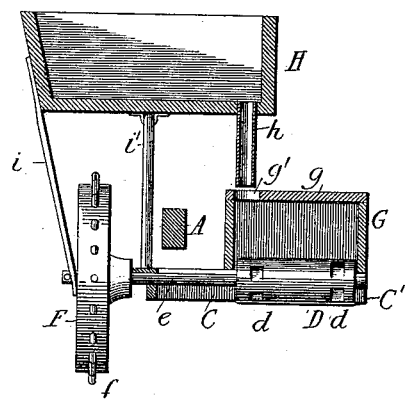
Witnesses
Inventor
Charles H. Whitney
By W. W. Dudley & Co.
his Attorneys

UNITED STATES PATENT OFFICE.

CHARLES H. WHITNEY, OF COOKEVILLE, TENNESSEE, ASSIGNOR OF ONE-HALF TO FRED H. WHITE, OF WHITE, SOUTH DAKOTA.

SEEDING ATTACHMENT FOR PLOWS.

SPECIFICATION forming part of Letters Patent No. 627,559, dated June 27, 1899.

Application filed March 8, 1899. Serial No. 708,166. (No model.)

*To all whom it may concern:*

Be it known that I, CHARLES H. WHITNEY, a citizen of the United States, residing at Cookeville, in the county of Putnam and State of Tennessee, have invented certain new and useful Improvements in Seeding Devices for Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to seeding devices for plows, and has for its object the production of an appliance of this character which is adapted for attachment to the forward end of the plow-beam, whereby the seed-deposits are made in advance of plowing and are covered by the turning of the ground.

A further object of the invention is the construction and arrangement of the parts by which the seed-hopper is supported independently of the plow-beam upon the wheel through which the seed-roll is actuated, whereby all tendency of the plow to tilt is avoided and the seeding device is permitted to freely rise and fall in passing over uneven ground.

Other advantages are possessed by my invention, which appear in the following description directed to the details of construction and operation, and in connection with such description attention is called to the accompanying drawings, in which—

Figure 1 is a side elevation of a seeding device embodying my invention. Fig. 2 is a plan view. Fig. 3 is a transverse sectional view on line 3 3 of Fig. 2.

Referring to the said drawings by letter, A denotes the plow-beam, to the forward end of which is secured by a clip B the seeding attachment. The clip comprises two members $b$ $b'$, each consisting of a plate having a slot $b^2$, and of a threaded bolt $b^3$, extending from one end of the plate at a right angle thereto. In practice the bolt of each member is passed through the slotted plate of the other, the plow-beam being interposed between the plates, and nuts $b^4$ are screwed on the bolts to secure the parts together. As a precaution against the nuts becoming loose I interpose between the nuts and plates washers $b^5$, having their inner side serrated and engaging the serrated outer face of the plates.

The frame C of the attachment is provided at its forward end with ears $c$, through which is passed a pin $d$, carried by the member $b$ of the clip. This frame supports all of the parts of the device, and therefore the latter is capable of movement independent of the plow and in practice readily follows the inequalities of the ground. Toward the rear end of the frame is a side extension $C'$, in which are mounted the seed-roll and shaft and on which is supported the seedbox. The seed-roll D has on its periphery seed-cups $d$, which when brought undermost by the rotation of the roll deposits its contents, which is immediately covered by the earth turned by the plow. The roll D is fixed to a shaft $e$, having bearings in the frame, and on said shaft is mounted the drive-wheel F, which is provided at its periphery with teeth $f$ to produce proper friction with the ground, with the end of insuring proper rotation of the seed-roll. The seedbox G is open at its lower side, but has at its top a cover $g$, preferably of the swinging type and provided with an opening $g'$ to receive the seed as it is discharged through a spout $h$, leading from a relatively large seed-hopper H. The hopper at its outer side is supported by a standard $i$, having its lower end connected with the shaft beyond the drive-wheel F. The other support for the hopper is a standard $i'$, extending from the frame to which it is secured to the under side of the hopper. It will be noticed that the hopper H, which is relatively heavy, is supported directly over the drive-wheel, and that therefore there is little or no tendency of the attachment to overbalance, as the seedbox is, comparatively speaking, light of weight and the amount of seed contained relative to that of the hopper is small.

In operation the seed passes from the hopper through the chute into the seedbox, from which it is intermittently deposited by the revolving seed-roll, the latter being actuated by the toothed drive-wheel F.

The device comprises few parts of simple and inexpensive construction, is light of weight, and capable of high efficiency in service.

I claim as my invention—

1. In combination with a plow-beam, a seeding attachment pivotally connected at its forward end with said beam, a drive-wheel affording a support for the attachment, a seed-roll on the shaft of the drive-wheel, and a seed-hopper supported over the drive-wheel having a discharge leading to the seed-roll.

2. In combination with a plow-beam, a seeding attachment pivotally connected by a clip with said beam, a toothed drive-wheel affording a support for the attachment, a seed-roll on the shaft of the drive-wheel, and a seed-hopper supported over the drive-wheel and having a spout leading to the seed-roll.

3. A seeding attachment adapted for pivotal connection at its forward end with a plow-beam, a toothed drive-wheel supporting the rearward end of the attachment, a seed-roll on the shaft of the drive-wheel, a seed-box above the roll, and a seed-hopper supported above the drive-wheel and having a spout discharging into the box, substantially as described.

In testimony whereof I affix my signature in presence of two witnesses.

CHARLES H. WHITNEY.

Witnesses:
L. GERTRUDE WHITNEY,
R. L. FARLEY.